US012748343B2

(12) United States Patent
Stern et al.

(10) Patent No.: US 12,748,343 B2
(45) Date of Patent: Sep. 29, 2026

(54) ACTUATOR LOCKING MECHANISM FOR IMAGE CAPTURE DEVICE

(71) Applicant: GoPro, Inc., San Mateo, CA (US)

(72) Inventors: Jonathan Stern, San Mateo, CA (US); Ian Griggs, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 546 days.

(21) Appl. No.: 18/038,113

(22) PCT Filed: Dec. 7, 2021

(86) PCT No.: PCT/US2021/062180
§ 371 (c)(1),
(2) Date: May 22, 2023

(87) PCT Pub. No.: WO2022/125533
PCT Pub. Date: Jun. 16, 2022

(65) Prior Publication Data

US 2024/0004270 A1 Jan. 4, 2024

Related U.S. Application Data

(60) Provisional application No. 63/122,880, filed on Dec. 8, 2020.

(51) Int. Cl.
*G03B 17/14* (2021.01)
*G03B 3/10* (2021.01)

(52) U.S. Cl.
CPC ............... *G03B 17/14* (2013.01); *G03B 3/10* (2013.01); *G03B 2205/0007* (2013.01)

(58) Field of Classification Search
CPC ........................................................ G02B 7/04
See application file for complete search history.

(56) References Cited

U.S. PATENT DOCUMENTS

| | | | | |
|---|---|---|---|---|
| 4,544,240 | A | 10/1985 | Shimizu | |
| 5,223,980 | A | 6/1993 | Hamasaki | |
| 6,337,775 | B1 * | 1/2002 | Wilson | G02B 7/02 359/702 |
| 2012/0188658 | A1 * | 7/2012 | Matsui | G02B 7/08 359/819 |
| 2016/0341926 | A1 * | 11/2016 | Byon | G02B 27/646 |
| 2017/0235092 | A1 | 8/2017 | Nagaoka | |

OTHER PUBLICATIONS

International Preliminary Report on Patentability issued in App. No. PCT/US2021/062180, mailing date Jun. 22, 2023, 6 pages.
International Search Report and Written Opinion issued in App. No. PCT/US2021/062180, dated Mar. 17, 2022, 7 pages.

* cited by examiner

*Primary Examiner* — Noam Reisner
(74) *Attorney, Agent, or Firm* — Young Basile Hanlon & MacFarlane, P.C.

(57) ABSTRACT

A system includes a barrel mount disposed within a body, and the barrel mount includes a central axis. The system includes a lens barrel secured within the barrel mount and aligned with the central axis. The system includes an actuator that adjusts a position of the lens barrel by moving the barrel mount along the central axis. The system includes an actuator locking mechanism securable over the barrel mount and/or the lens barrel that prevents movement of the actuator and/or barrel mount when applying a force along the central axis towards the actuator.

16 Claims, 9 Drawing Sheets

ACTUATOR LOCKING MECHANISM FOR IMAGE CAPTURE DEVICE

CROSS-REFERENCE TO RELATED APPLICATIONS

This application is a 371 of International Application No. PCT/US2021/062180 filed on Dec. 7, 2021, which claims the priority to U.S. Provisional Application No. 63/122,880, filed on Dec. 8, 2020, the entire disclosures of which are hereby incorporated by reference.

TECHNICAL FIELD

This disclosure relates generally to image capture devices and specifically to locking mechanisms to limit motion of lens assemblies in an image capture device.

BACKGROUND

Imaging devices can include actuators, mechanisms that convert energy into operations such as linear movement, rotation, or bending, configured for use with lens assemblies in order to support calibration of focal length after assembly, to correct focal length due to thermal changes to components, or to allow for different modes of operation for the lens assembly. Though useful to correct positioning in these cases, imaging devices with actuators are susceptible to other motion, such as vibration, that can cause shakiness, wobbling, or other motion artifacts in image or video capture which is exacerbated by the inherent ability to move enabled by the actuator.

SUMMARY

The present disclosure provides a system and a method that limits motion of a lens or lens barrel.

In one implementation, a system includes a barrel mount disposed within a body, and the barrel mount includes a central axis. The system includes a lens barrel secured within the barrel mount and aligned with the central axis. The system includes an actuator that adjusts a position of the lens barrel by moving the barrel mount along the central axis. The system includes an actuator locking mechanism securable over the barrel mount and/or the lens barrel that prevents movement of the actuator and/or the barrel mount by applying a force along the central axis towards the actuator.

The system may include one or more of the following features.

The barrel mount may further include a flange connected with the actuator, and the actuator may move the barrel mount along the central axis at the flange. The actuator may include a cam that adjusts a position of the barrel mount along the central axis and a compressible component that applies a force against the cam. The actuator locking mechanism may include a compressible component that applies the force along the central axis towards the actuator when the actuator locking mechanism is secured over the barrel mount and/or the lens barrel. The lens barrel may include a first split lens barrel associated with the actuator locking mechanism and a second split lens barrel associated with the barrel mount. The first and second split lens barrels may be separated by a compressible component of the actuator locking mechanism that applies the force along the central axis against the actuator. The compressible component and the actuator locking mechanism may apply the respective forces along the central axis in a same direction. The cam may be positioned between the flange and the compressible component so that the compressible component and the actuator locking mechanism apply the respective forces along the central axis in opposing directions. The actuator locking mechanism may apply and release the force along the central axis by rotating or snap-fitting relative to the barrel mount. The lens barrel may be in a fixed position relative to the barrel mount, and the lens barrel may include two or more lenses. When the actuator locking mechanism is secured over the barrel mount and/or the lens barrel, a sensor of the system may capture light through one or more lenses of the lens barrel and/or the actuator locking mechanism.

In another implementation, the method includes applying, using an actuator of an image capture device, a first force on a barrel mount of the image capture device along a central axis extending longitudinally through the barrel mount. The method includes applying, using an actuator locking mechanism, a second force on the barrel mount along the central axis such that movement of at least one of the barrel mount and a lens barrel of the image capture device disposed within the barrel mount is prevented by the applied first and second forces.

The method may include one or more of the following features.

The actuator may include a cam that adjusts a position of the lens barrel by moving the barrel mount along the central axis and a compressive component that applies the first force along the central axis against the cam and/or a flange of the barrel mount so that movement of the barrel mount is prevented. The first and second forces may be applied against the cam in a same direction or in opposing directions. The actuator locking mechanism may rotate relative to the lens barrel and/or the barrel mount so that the second force is applied along the central axis. The actuator locking mechanism may be compressed against the lens barrel and/or the barrel mount so that the second force is applied along the central axis. The lens barrel may include a first split lens barrel associated with the actuator locking mechanism and a second split lens barrel associated with the lens barrel. The first split lens barrel and the actuator locking mechanism may be detachable from the barrel mount.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

An actuator can be used to modify a position of a lens barrel and/or barrel mount in relation to an image sensor or other components in an image capture device, for example, to execute a calibration, modify focus, or correct focus for thermal degradation. An actuator locking mechanism and a detachable lens module for the image capture device for use in conjunction with the actuator are described herein and can be configured to secure a position of the lens barrel and/or barrel mount in respect to the image capture device by supplementing forces generated by the actuator to limit motion in order to avoid shake or motion in image and video capture. By applying one or more forces against the barrel mount and/or lens barrel, the actuator locking mechanism prevents movement of the lenses during a high intensity activity, such as hiking, surfing, skiing, or the like. The actuator locking mechanism used herein can be implemented once the lens barrel attains an appropriate focus level, so the image capture device is still adjustable when required by the user.

Figure 1A:
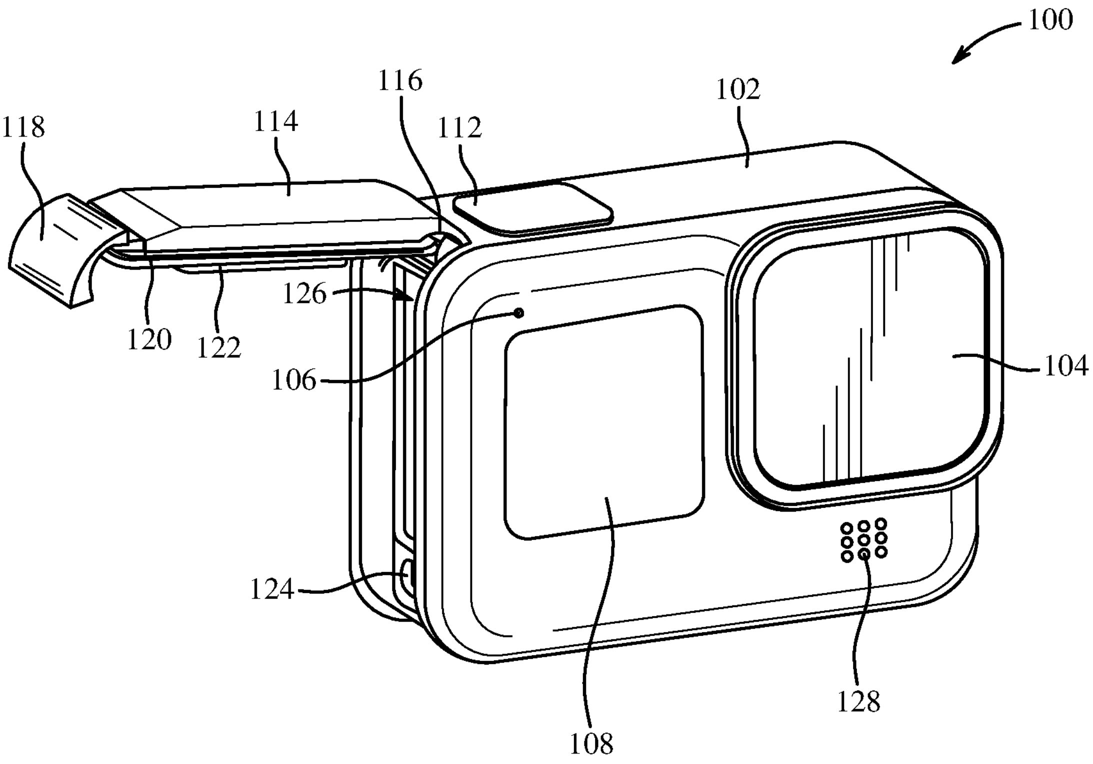
FIGS. 1A-B are isometric views of an example of an image capture device.
Figure 1B:
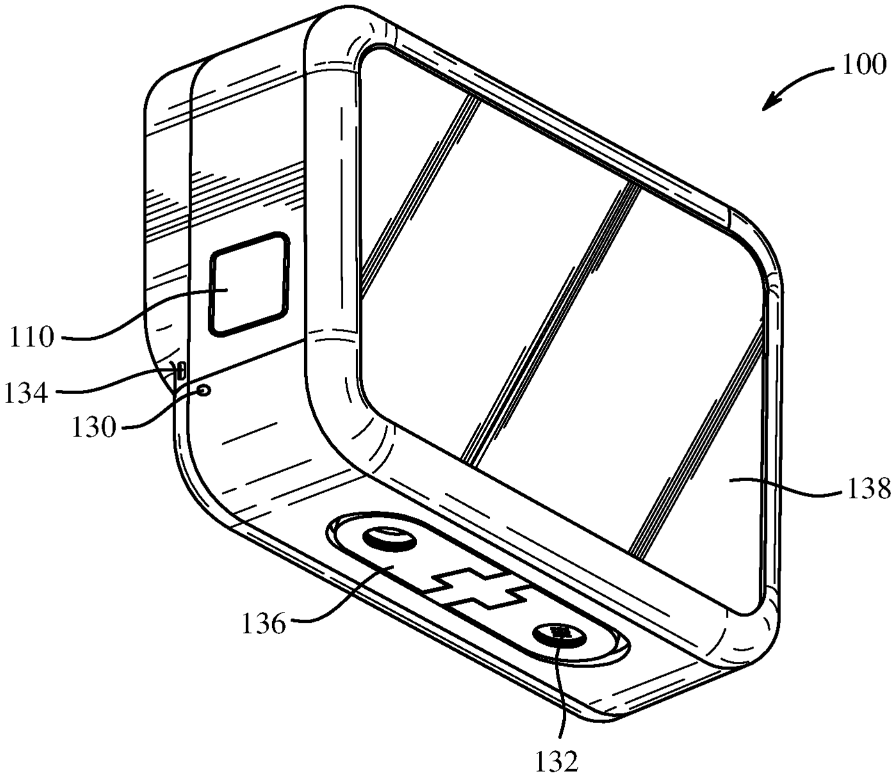

FIGS. 1A-B are isometric views of an example of an image capture device 100.

The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 4A:
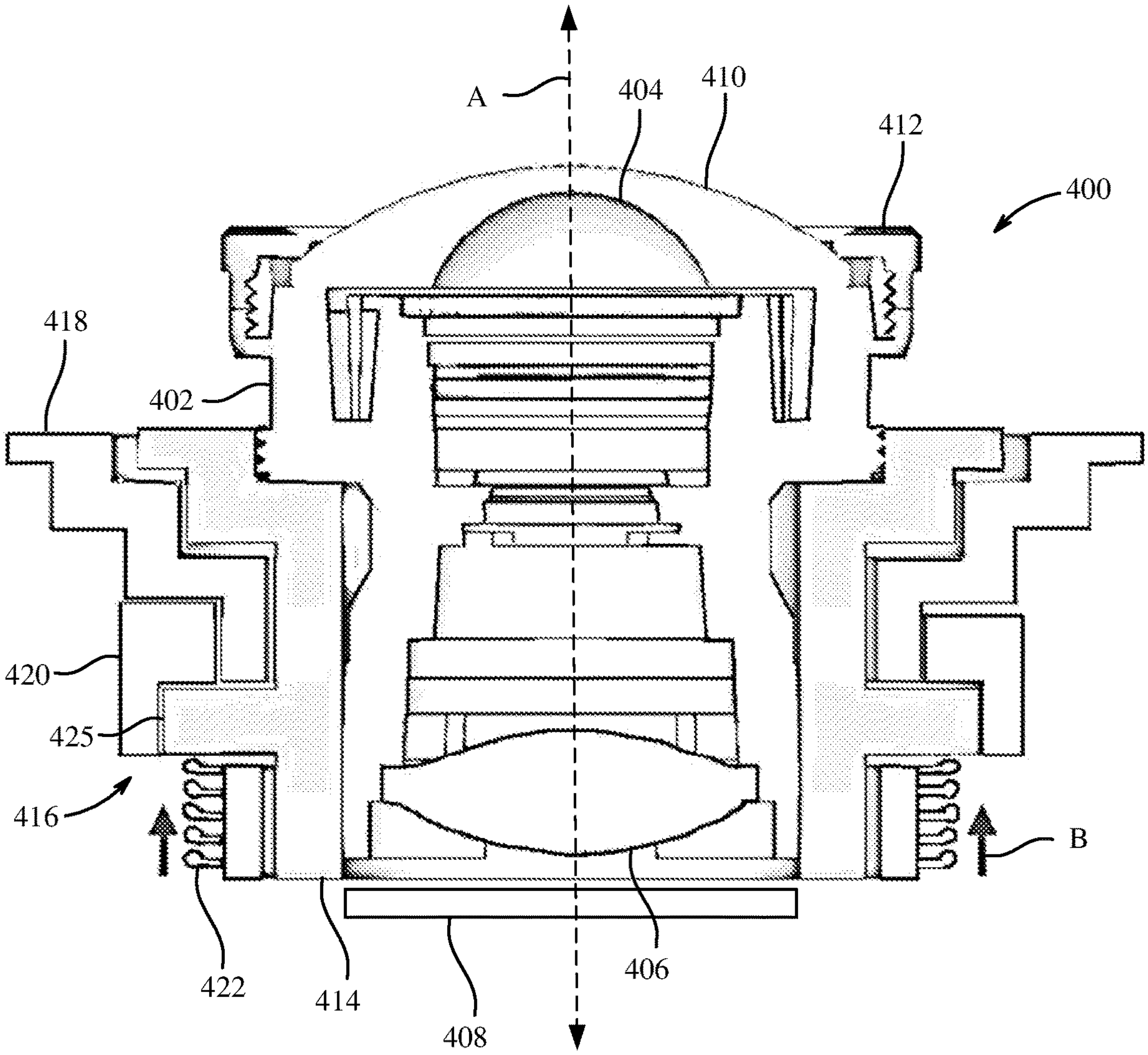
FIGS. 4A-B illustrate a cross-sectional side view of an example of a system with actuation for use in an image capture device.
Figure 4B:
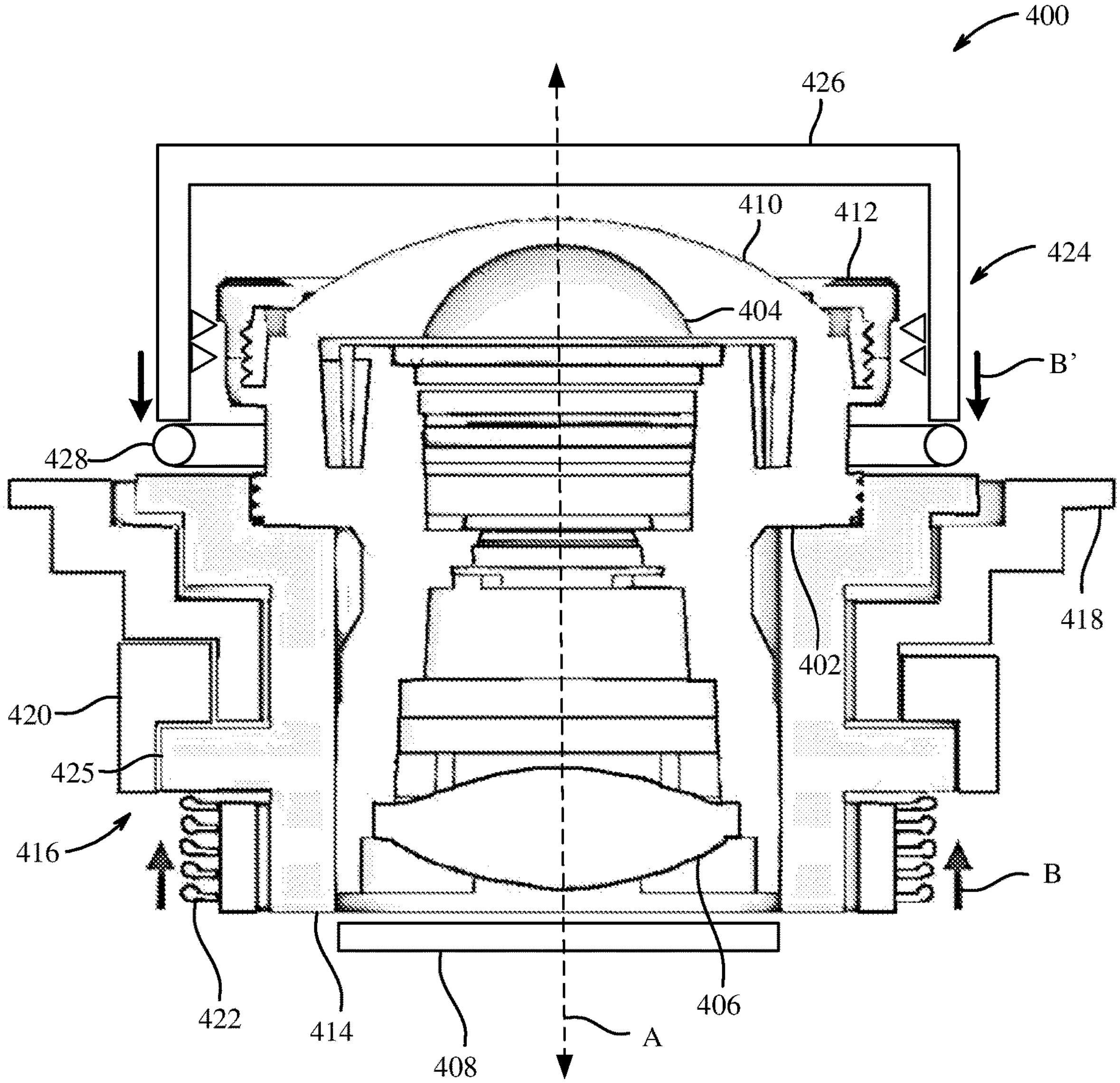
Figure 5:
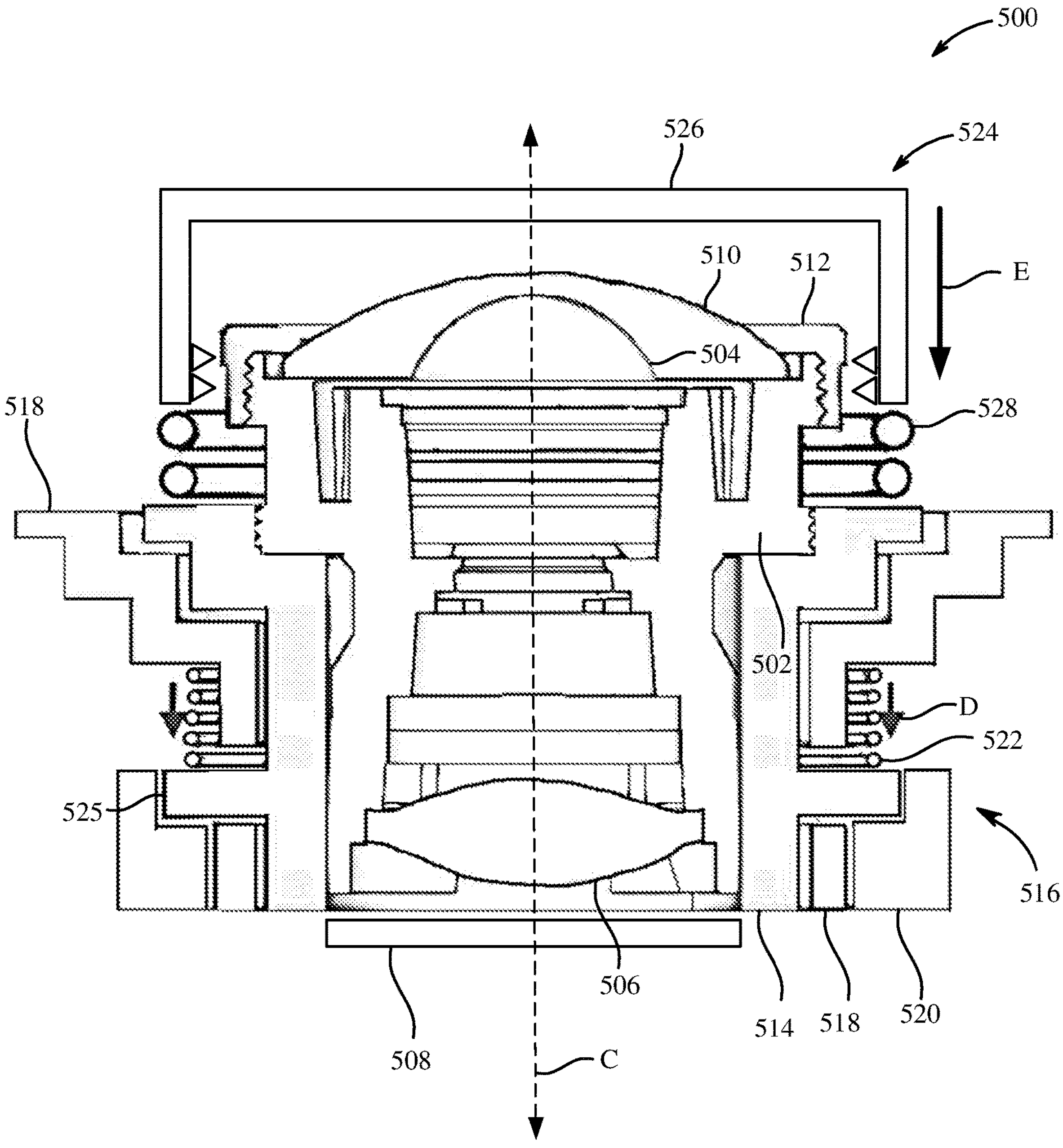
FIG. 5 illustrates a cross-sectional side view of another example of a system with actuation for use in an image capture device.
Figure 6:
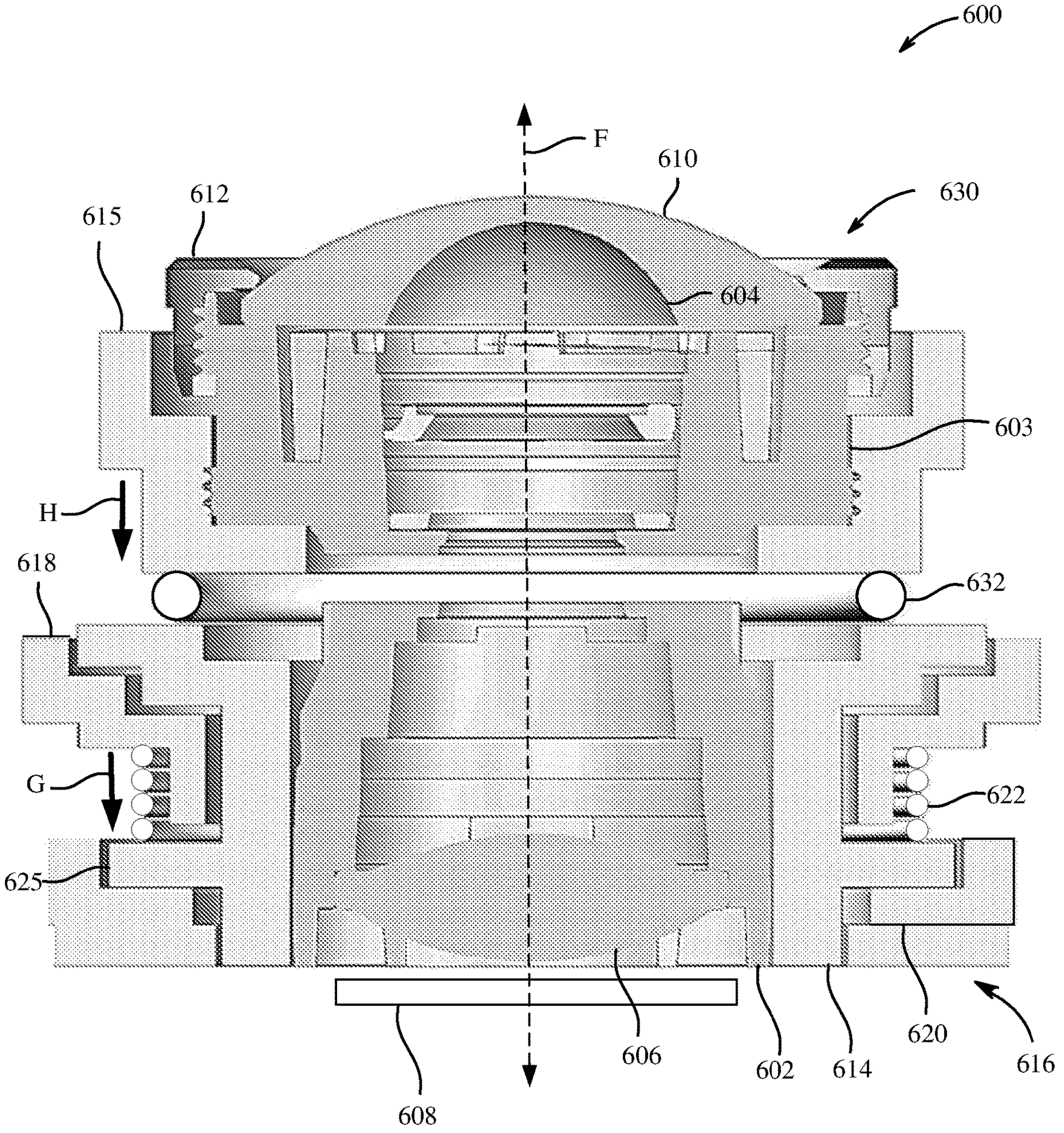
FIG. 6 illustrates a cross-sectional side view of another example of a system with actuation for use in an image capture device.

The image capture device 100 may be used to implement some or all of the techniques described in this disclosure, such as the actuation techniques described in FIGS. 4, 5, and 6.

Figure 2A:
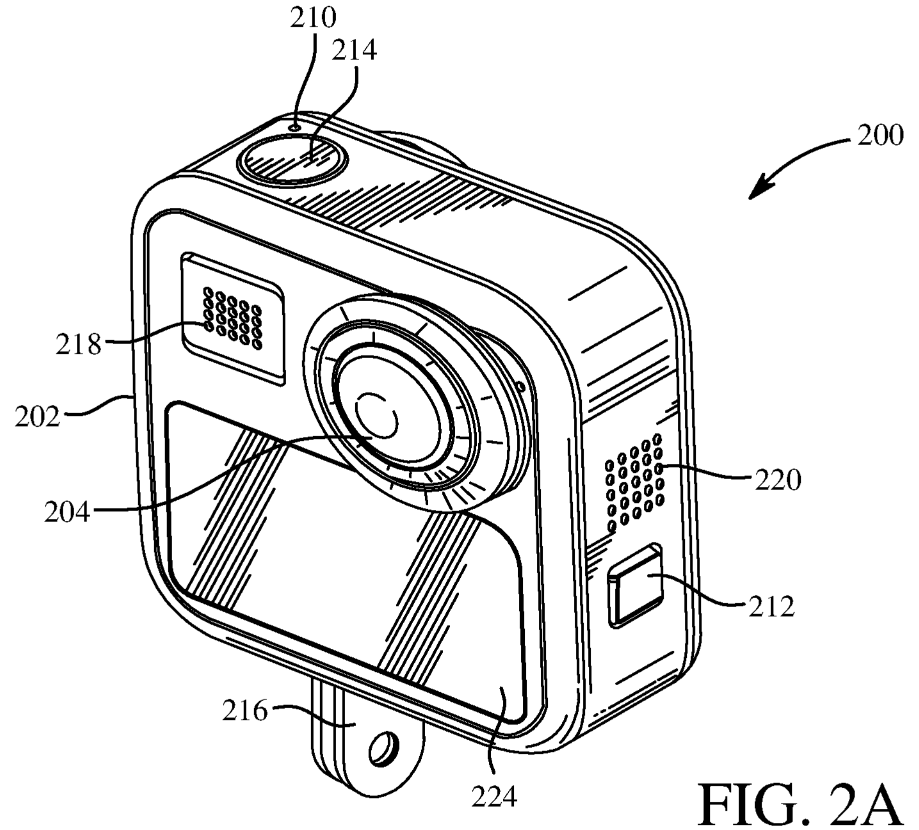
FIGS. 2A-B are isometric views of another example of an image capture device.
Figure 2B:
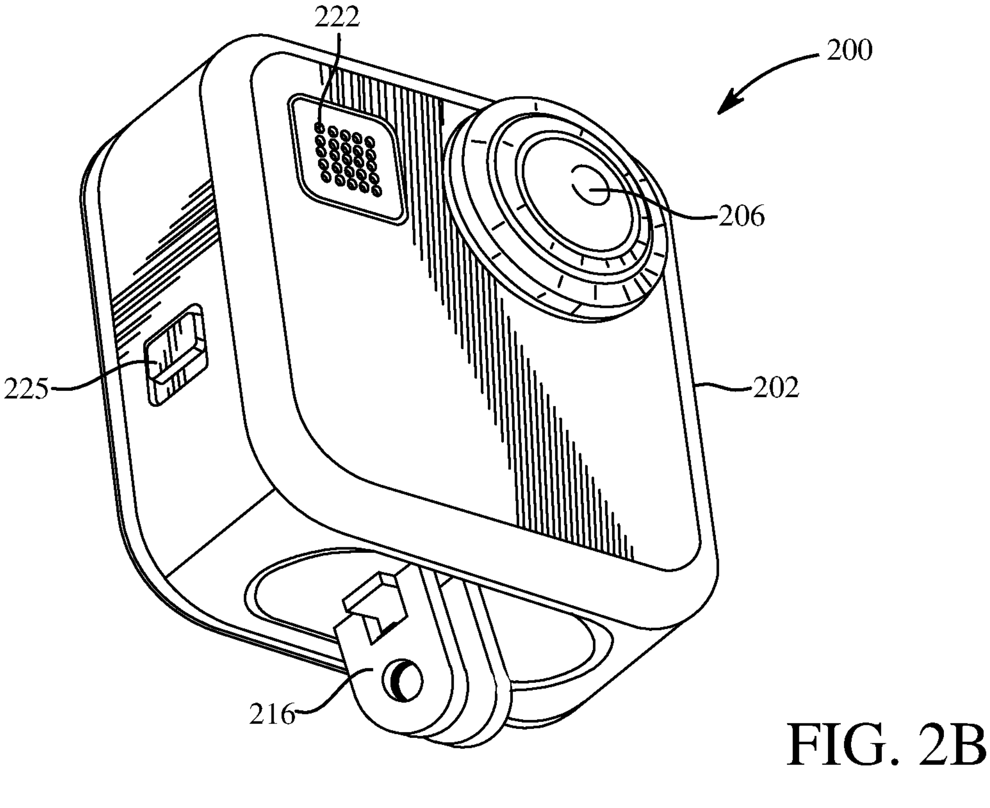

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
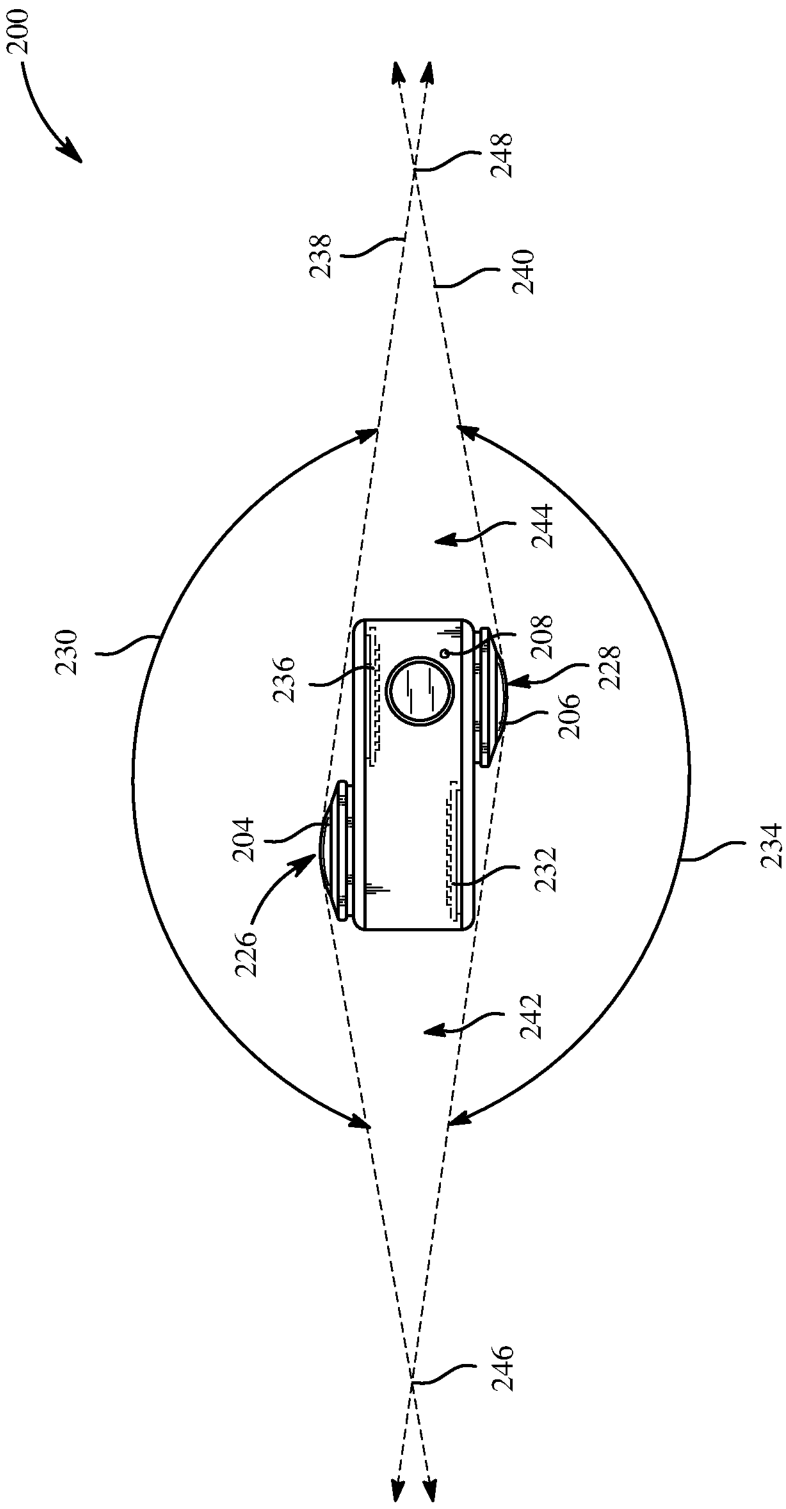
FIG. 2C is a top view of the image capture device of FIGS. 2A-B.
Figure 2D:
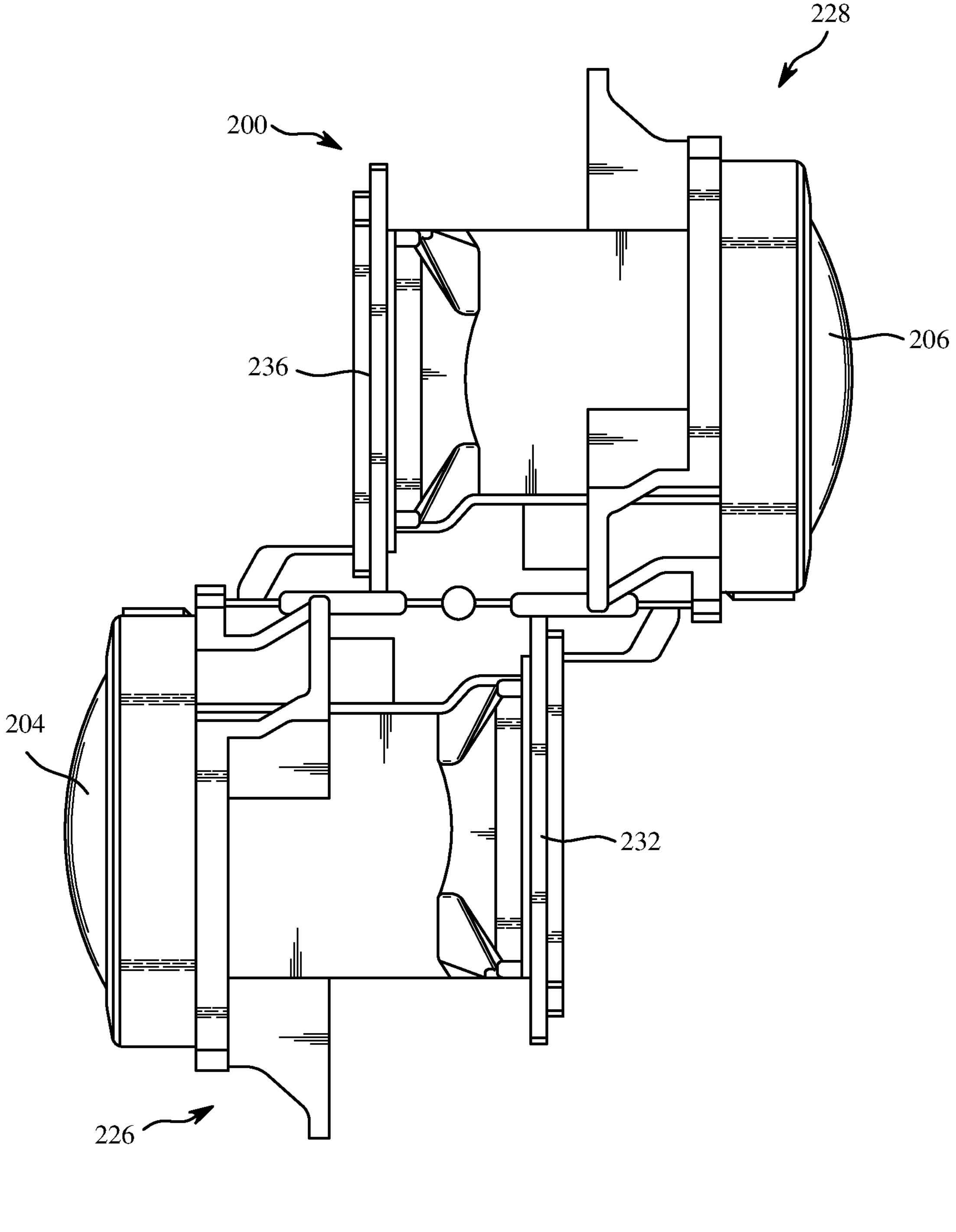
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the techniques described in this disclosure, such as the actuation techniques described in FIGS. 4, 5, and 6.

Figure 3:
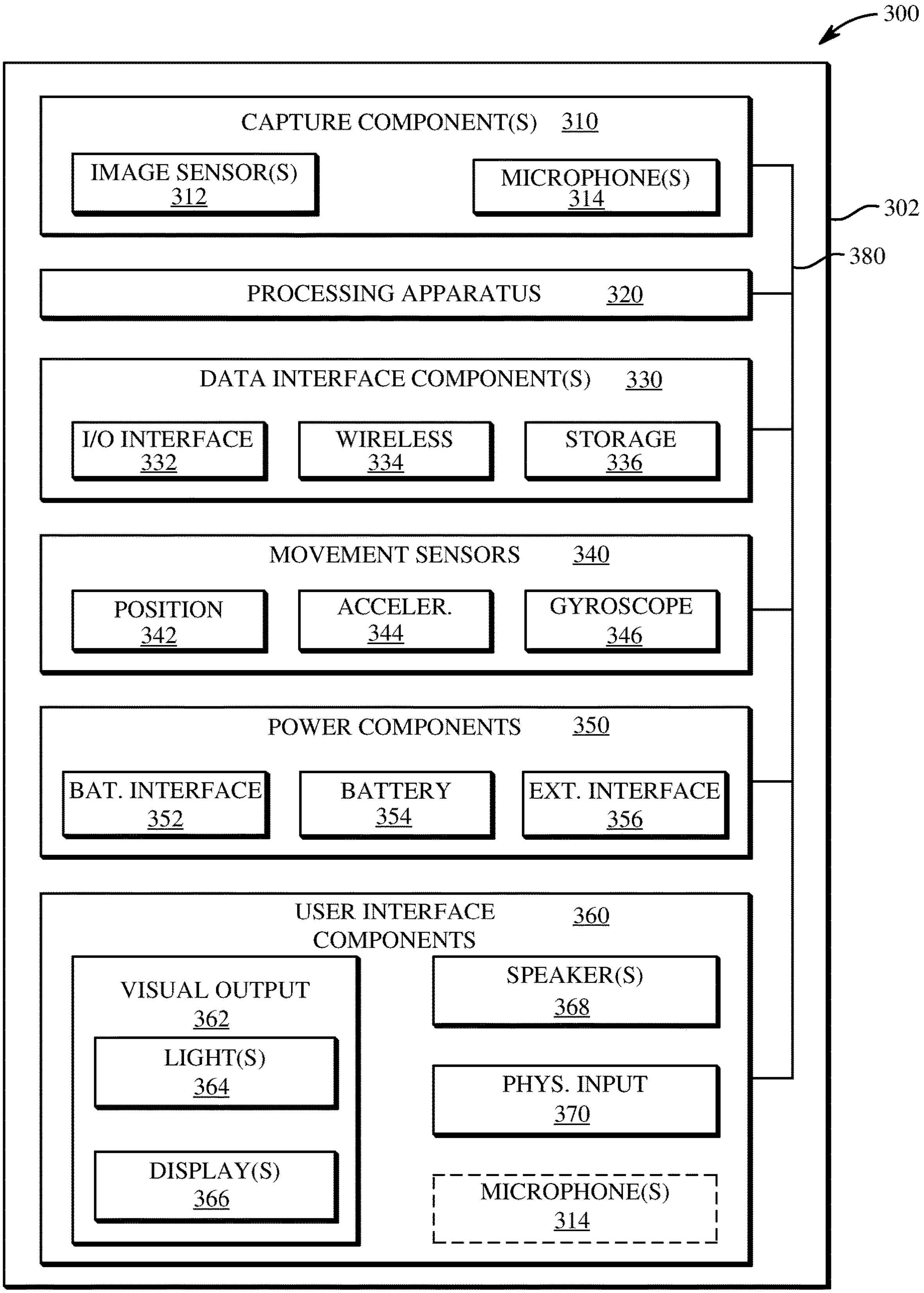
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the actuation techniques described in FIGS. 4, 5, and 6.

FIG. 4A-4B illustrate a cross-sectional side view of an example of a system 400. The system 400 includes a lens barrel 402, inner lenses 404, 406 mounted proximate to respective ends of the lens barrel 402, an image sensor 408, an outer lens 410, and a retaining ring 412 for securing the outer lens 410 to the lens barrel 402. The system 400 also includes a barrel mount 414 and an actuator 416 configured to position the barrel mount 414 in respect to a body structure 418. The system 400 also includes an actuator locking mechanism 424 configured to exert force against the barrel mount 414. The system 400 may be implemented as part of an image capture device (not shown), such as the image capture device 100 of FIGS. 1A to 1D, the image capture device 200 of FIGS. 2A to 2D, or the image capture device 300 of FIGS. 3A-3B.

The system 400 includes the lens barrel 402 that is fixed in position in respect to the barrel mount 414 for integration into an image capture device. The lens barrel 402 may be detachably fixed with respect to the barrel mount 414, and the lens barrel 402 may be removed or released from the barrel mount 414 by rotating the lens barrel 402 relative to the barrel mount. The lens barrel 402 holds the inner lenses 404, 406 (and in some examples, additional inner lenses) with the inner lenses 404, 406 configured to refract light propagating through the lens barrel 402 to focus the light for detection by the image sensor 408. For example, the inner lenses 404, 406 may be attached (e.g., using glue and/or ledges and flanges (not shown)) to inner walls of the lens barrel 402, and the lens barrel 402 may be attached (e.g. using glue and/or ledges and flanges (not shown)) to the barrel mount 414. The inner lenses 404, 406 may be oriented to direct light from a first end of the lens barrel 402, in a manner roughly parallel to an optical axis A of the lens barrel 402, to a second end of the lens barrel 402, where the light may be detected by the image sensor 408 to capture an image or a video.

The system 400 includes the outer lens 410 and the retaining ring 412 that affixes the outer lens 410 to the lens barrel 402. In some implementations, the outer lens 410 is secured in the retaining ring 412 as a captured mount, such that the outer lens 410 may be rotated within the retaining ring 412. For example, the outer lens 410 and the retaining ring 412 may be interlocked (e.g., using a flange 425 and slot interface around a circumference of the outer lens 410) and travel together but the outer lens 410 may still be loose enough to turn inside the retaining ring 412 independently. In some implementations, the retaining ring 412 is firmly held in a fixed orientation in the first arrangement by a friction lock formed by pressing the retaining ring 412 against the outer lens 410 in its position covering the first end of the lens barrel 402. An O-ring (not shown) or other seal may be present between the retaining ring 412 and the outer lens 410.

The system 400 includes the image sensor 408 mounted within a body (not shown) of an image capture device proximate to an end of the lens barrel 402 near the inner lens 406. The image sensor 408 may be configured to detect images based on light incident on the image sensor 408 through the outer lens 410 and the inner lenses 404 and 406 when the retaining ring 412 affixes the outer lens 410 to the lens barrel 402. The image sensor 408 may be configured to detect light of a certain spectrum (e.g., the visible spectrum or the infrared spectrum) and convey information constituting an image as electrical signals (e.g., analog or digital signals). For example, the image sensor 408 may include charge-coupled devices (CCD) or active pixel sensors in complementary metal-oxide-semiconductor (CMOS). In some implementations, the image sensor 408 includes a digital to analog converter. For example, the image sensor 408 may be configured to detect image data using a plurality of selectable exposure times.

The system 400 includes the barrel mount 414 configured to receive the lens barrel 402, such as by press-fit, snap-fit, twist-lock, etc. and coupled using glue or other securing means to ensure that the lens barrel 402 and the inner lenses 404, 406 are immovable in respect to the barrel mount 414. The barrel mount 414 is configured to move in respect to the body structure 418 in a direction coincident with (generally parallel to) the optical axis A, for example, in order to fine tune focus of the lenses 404, 406, 410 in respect to the image sensor 408 during calibration or altered focus operational modes or to counteract thermal cycling or degradation between components to maintain focus. Motion of the barrel mount 414 can be controlled based on motion of the actuator 416.

The actuator 416 includes a cam 420 and a compressible component 422. Rotation of the cam 420 around the body structure 418 causes movement of the barrel mount 414 and compression (or decompression) of the compressible component 422. When compressed, the compressible component 422 exerts a force in a direction B against the barrel mount 414 which is held in position against the cam 420. The compressible component 422 may include a spring (shown), a gasket, a foam seal, or any other compliant member. In this way, rotation of the cam 420 can be used to change and hold a position of the lenses 404, 406, 410 in respect to the image sensor 408. The actuator 416 can be controlled by a motor (not shown) such as a rotary motor with gearing, a linear motor, or a piezo-electric motor. The actuator 416 can be alternatively implemented using a ball screw, a flexure, or any other mechanism sufficient to control a position of the barrel mount 414 in respect to the body structure 418 of the image capture device.

The use of an actuator 416 requires low axial force between components in the system 400 in order to allow for movement of the barrel mount 414 and is useful to implement small changes to focal length for calibration or optical mode changes. However, the system 400 that includes the actuator 416 can be susceptible to more forceful motion experienced by the image capture device, such as motion based on impacts (dropping, hitting, bumping, etc.), high-impact activities (skiing, surfing, running, sky diving, rock climbing, biking, etc.), use over rough terrain, vibration, etc. These more forceful motions can cause the barrel mount 414 to experience unintended displacement that impacts image or video detection. For example, unintended displacement of the barrel mount 414 along the optical axis A can change magnification and create an impression of video moving toward and away from a viewer. In another example, unintended displacement of the barrel mount 414 along the optical axis A can change focus and create an impression of video oscillating between being in and out of focus. In another example, unintended displacement of the barrel mount 414 radially outward from or tilted in respect to the optical axis A can create an impression of video shaking from side to side, up and down, or both.

FIG. 4B shows one example of a solution to counteract, lessen, or prevent unintended motion of the barrel mount 414. The compressible component 422 can be designed to exert a relatively high force in the direction B such that a motor (not shown) associated with the actuator 416 is unable to cause rotation of the cam 420 and movement of the barrel mount 414 is prevented in respect to the body structure 418 along the optical axis A. To counteract this locked condition, the actuator locking mechanism 424 can be press-fitted, snap-fitted, twist-locked, affixed, secured, or otherwise attached to the system 400 in order to counteract the force applied by the compressible component 422 against the barrel mount 414 in the direction B.

The actuator locking mechanism 424 may include a securing component 426 and a compressible component 428 as shown in FIG. 4B. The securing component 426 can be in the form of a cover that can be press-fitted, snap-fitted, or twisted to lock or secure the actuator locking mechanism 424 over the retaining ring 412, a lens that can be affixed to outer lens 410, a replacement for the outer lens 410 that is secured using the retaining ring 412, or any other manner of component that is able to be secured to the system 400 and is configured to exert a force in the direction B' against the compressible component 428. The direction B' is opposite the direction B. Thus, the force in the direction B' can serve to partially or fully counteract the force in the direction B such that the actuator 416 is able to effect movement of the barrel mount 414 in respect to the body structure 418.

The compressible component 428 of the actuator locking mechanism 424 may include a spring, a gasket (shown), a foam seal, or any other compliant member that will exert a force against the barrel mount 414 in the direction B' when under compression by means of the securing component 426. The compressible component 428 may include one component (shown in FIG. 4B) or may include a combination of components, such as two or more gaskets, one or more gaskets and one or more springs, or any combination of two components described herein (springs, gaskets, foam seals, etc.). The compressible component 428 can be affixed to the securing component 426 or affixed or held in position in respect to the barrel mount 414 by a releasable component, such as a twist-lock, snap-fit, or press-fit mechanism. Another example of a solution to counteract, lessen, or prohibit unintended motion of the barrel mount 414, an actuator locking mechanism, can be employed to another actuated system as is described in FIG. 5 or 6.

FIG. 5 illustrates a cross-sectional side view of another example of a system 500. The system 500 includes a lens barrel 502, inner lenses 504, 506 mounted proximate to respective ends of the lens barrel 502, an image sensor 508, an outer lens 510, and a retaining ring 512 for securing the outer lens 510 to the lens barrel 502. The system 500 includes a barrel mount 514 and an actuator 516 configured to position the barrel mount 514 in respect to a body structure 518. The system 500 also includes an actuator locking mechanism 524 configured to exert force against the barrel mount 514. The system 500 may be implemented as part of an image capture device (not shown), such as the image capture device 100 of FIGS. 1A to 1D, the image capture device 200 of FIGS. 2A to 2D, or the image capture device 300 of FIGS. 3A-3B.

The system 500 includes the lens barrel 502 that is fixed in position in respect to the barrel mount 514 for integration into an image capture device. The lens barrel 502 holds the inner lenses 504, 506 (and in some examples, additional inner lenses) within the outer lens 510, which in combination are configured to refract light propagating through the lens barrel 502 to focus the light for detection by the image sensor 508. For example, the inner lenses 504, 506 may be attached (e.g., using glue and/or ledges and flanges (not shown)) to inner walls of the lens barrel 502, and the lens barrel 502 may be attached (e.g. using glue and/or ledges and flanges (not shown)) to the barrel mount 514. The inner lenses 504, 506 may be oriented to direct light from a first end of the lens barrel 502, in a manner roughly parallel to an optical axis C of the lens barrel 502, to a second end of the lens barrel 502, where the light may be detected by the image sensor 508 to capture an image or a video.

The system 500 includes the outer lens 510 and the retaining ring 512 that affixes the outer lens 510 to the lens barrel 502. An O-ring (not shown) or other seal may be present between the retaining ring 512 and the outer lens 510. The system 500 also includes the image sensor 508 mounted within a body (not shown) of an image capture device proximate to an end of the lens barrel 502 near the inner lens 506. The image sensor 508 may be configured to detect images based on light incident on the image sensor 508 through the outer lens 510 and the inner lenses 504 and 506 when the retaining ring 512 affixes the outer lens 510 to the lens barrel 502. The image sensor 508 may be similar to the image sensor 408 of FIG. 4.

The system 500 includes the barrel mount 514 configured to receive the lens barrel 502, such as by press-fit, snap-fit, twist-lock, etc. or coupled using glue or other securing means (not shown) to ensure that the lens barrel 502 and the inner lenses 504, 506 are immovable in respect to the barrel mount 514. The barrel mount 514 and/or the lens barrel 502 is configured to move in respect to the body structure 518 in a direction coincident with (generally parallel to) the optical axis C, for example, in order to fine tune focus of the lenses 504, 506, 510 in respect to the image sensor 508 during calibration or altered focus operational modes or to counteract thermal cycling or degradation between components to maintain focus. Motion of the barrel mount 514 can be controlled based on motion of the actuator 516.

The actuator 516 includes a cam 520 and a compressible component 522. Rotation of the cam 520 around the body structure 518 moves the barrel mount 514 to cause compression (or decompression) of the compressible component 522. When compressed, the compressible component 522 exerts a force in a direction D against the barrel mount 514 which is held in position against the cam 520. The compressible component 522 may include a spring (shown), a gasket, a foam seal, or any other compliant member. In this way, rotation of the cam 520 can be used to change and hold a position of the lenses 504, 506, 510 in respect to the image sensor 508. The actuator 516 can be controlled by a motor (not shown) such as a linear motor or a piezo-electric motor. The actuator 516 can be alternatively implemented using a ball screw, a flexure, or any other mechanism sufficient to control a position of the barrel mount 514 in respect to the body structure 518 of the image capture device. Positioning of the barrel mount 514 is such that the compressible component 522 exerts a force in the direction D, which is opposite in direction from the direction B of the force exerted by the compressible component 422 of FIG. 4. In other words, the cams 420, 520 and the compressible components 422, 522 are on opposite sides of projections extending from the respective barrel mounts 414, 514 such that force is applied by the respective compressible components 422, 522 to the respective barrel mounts 414, 514 in opposite directions.

Because the actuator 516 is structured such that the cam 520 and the compressible component 522 are compressed together against opposite sides of a flange 525 of the barrel mount 514, the compressible component generates a force in the direction D to hold the barrel mount 514 against the cam 520. The actuator locking mechanism 524 can then be implemented to provide additional force against the barrel mount 514 in a direction E as shown. As the direction D and the direction E are the same, the forces generated with components of the actuator 516 and the actuator locking mechanism 524 can combine to secure the barrel mount 514 in position in respect to the body structure 518 (and the cam 520). Based on the combined forces, the actuator 516 may become locked in that a motor (not shown) or other movement mechanism of the actuator 516 may be unable to overcome the combined forces to generate motion such that the barrel mount 514 can no longer move in respect to the body structure 518 or the cam 520 regardless of external conditions experienced by the system 500 such as impacts (dropping, hitting, bumping, etc.), use over rough terrain, vibration, etc.

In this way, use of the actuator locking mechanism 524 can reduce or prevent unintended motion of the barrel mount 514. The motion can be reduced or prevented both along the optical axis C and in directions radially outward or tilting in respect to the optical axis C. To achieve the locking feature, the actuator locking mechanism 524 can be designed such that the force provided by the actuator locking mechanism 524 in the direction E is any amount of force sufficient to counter the force in the direction D so that motion of the barrel mount 514 is prevented. For example, the force in the direction E can be equal, double, triple, or ten times greater than the force provided by the actuator 516 in the direction D.

The actuator locking mechanism 524 may include a securing component 526 and a compressible component 528 as shown in FIG. 5. The securing component 526 can be in the form of a cover that can be press-fit, snap-fit, or twist-locked over the retaining ring 512, a lens that can be affixed to outer lens 510, a replacement for the outer lens 510 that is secured using the retaining ring 512, or any other manner of component that is able to be secured to the system 500 and is configured to exert a force in the direction E against the compressible component 528.

The compressible component 528 may include a spring (shown), a gasket, a foam seal, or any other compliant member that will exert a force against the barrel mount 514 in the direction E when under compression by means of the securing component 526. The compressible component 528 can be affixed to the securing component 526 or affixed or held in position in respect to the barrel mount 514. Under the combined forces generated in the directions D and E by the compressible components 522, 528, the barrel mount 514 can be held in position in respect to the body structure 518 and the cam 520 so that when the image sensor 508 is detecting an image, the lens barrel 502 is not misaligned.

FIG. 6 illustrates a cross-sectional side view of another example of a system 600. The system 600 includes split lens barrels 602, 603, inner lenses 604, 606 mounted proximate to respective ends of the split lens barrels 602, 603, an image sensor 608, an outer lens 610, and a retaining ring 612 for securing the outer lens 610 to the split lens barrel 603. The system 600 includes split barrel mounts 614, 615 and an actuator 616 configured to position the split barrel mount 614 in respect to a body structure 618. The system 600 also includes a detachable lens module 630 that includes the inner lens 604 attached to the split lens barrel 603 which is affixed to the split barrel mount 615. The detachable lens module 630 is configured to exert force against the split barrel mount 614 via a compressible component 632 when secured to the system 600. The system 600 may be implemented as part of an image capture device (not shown), such as the image capture device 100 of FIGS. 1A to 1D, the image capture device 200 of FIGS. 2A to 2D, or the image capture device 300 of FIGS. 3A-3B.

The split lens barrel 602 is fixed in position in respect to the split barrel mount 614 for integration into an image capture device. The split lens barrel 602 holds the inner lens 606 (and in some examples, additional inner lenses) with the inner lens 606 configured to refract light propagating through the split lens barrel 602 to focus the light for detection by the image sensor 608. For example, the inner lens 606 may be attached (e.g., using glue and/or ledges and flanges (not shown)) to inner walls of the split lens barrel 602, and the split lens barrel 602 may be attached (e.g. using glue and/or ledges and flanges (not shown)) to the split barrel mount 614. The inner lens 606 may be oriented to direct light from a first end of the split lens barrel 602, in a manner roughly parallel to an optical axis F of the split lens barrels 602, 603, to a second end of the split lens barrel 602, where the light may be detected by the image sensor 608 to capture an image or a video. The split lens barrel 603 includes the inner lens 604, the outer lens 610, and the retaining ring 612 that affixes the outer lens 610 to the split lens barrel 603. An O-ring (not shown) or other seal may be present between the retaining ring 612 and the outer lens 610.

The system 600 also includes the image sensor 608 mounted within a body (not shown) of an image capture device proximate to an end of the split lens barrel 602 near the inner lens 606. The image sensor 608 may be configured to detect images based on light incident on the image sensor 608 through the outer lens 610 and the inner lenses 604 and 606 when the detachable lens module 630 is affixed to the system 600. The image sensor 608 may be similar to the image sensors 408, 508 of FIGS. 4 and 5.

The split barrel mounts 614, 615 are configured to receive the split lens barrels 602, 603 such as by press-fit, twist-lock, etc. and coupled using glue or other securing means (not shown) to ensure that the split lens barrels 602, 603 and the inner lenses 604, 606 are immovable in respect to the respective barrel mounts 614, 615. The split barrel mount 614 is configured to move in respect to the body structure 618 in a direction coincident with (generally parallel to) the optical axis F, for example, in order to fine tune focus of the lenses 604, 606, 610 in respect to the image sensor 608 during calibration or altered focus operational modes or to counteract thermal cycling or degradation between components to maintain focus. Motion of the split barrel mount 614 in respect to the body structure 618 can be controlled using the actuator 616.

The actuator 616 includes a cam 620 and a compressible component 622. Rotation of the cam 620 around the body structure 618 moves the split barrel mount 614 to cause compression (or decompression) of the compressible component 622. When compressed, the compressible component 622 exerts a force in a direction G against the split barrel mount 614 which is held in position against the cam 620. The compressible component 622 may include a spring (shown), a gasket, a foam seal, or any other compliant member. In this way, rotation of the cam 620 can be used to change and hold a position of the lens 606 in respect to the image sensor 608.

The actuator 616 can be controlled by a motor (not shown) such as a rotary motor with gearing, a linear motor, or a piezo-electric motor. The actuator 616 can be alternatively implemented using a ball screw, a flexure, or any other mechanism sufficient to control a position of the split barrel mount 614 in respect to the body structure 618 of the image capture device. Positioning of the split barrel mount 614 is such that the compressible component 622 exerts a force in the direction G, which is opposite in direction from the direction B of the force exerted by the compressible component 422 of FIG. 4. In other words, the cams 420, 620 and the compressible components 422, 622 are on opposite sides of projections extending from the respective barrel mounts 414, 614 such that force is applied by the respective compressible components 422, 622 to the respective barrel mounts 414, 614 in opposite directions.

Because the actuator 616 is structured such that the cam 620 and the compressible component 622 are compressed together against opposite sides of a flange 625 of the split barrel mount 614, the compressible component generates a force in the direction G to hold the split barrel mount 614 against the cam 620. The detachable lens module 630 can be used to provide additional force against the split barrel mount 614 in a direction H as shown using another compressible component 632. As the direction G and the direction H are the same, the forces generated by the compressible components 622, 632 against parallel surfaces of the split barrel mount 614 can combine to secure the split barrel mount 614 in position in respect to the body structure 618 (and the cam 620). Based on the combined forces from the compressible components 622, 632, the actuator 616 may become locked in that a motor (not shown) or other movement mechanism of the actuator 616 may be unable to overcome the combined forces to generate motion such that the split barrel mount 614 can no longer move in respect to the body structure 618 or the cam 620 regardless of external conditions experienced by the system 600 such as impacts (dropping, hitting, bumping, etc.), use over rough terrain, vibration, etc.

In this way, use of the detachable lens module 630 can reduce or prohibit unintended motion of the split barrel mount 614. The motion can be reduced or prohibited both along the optical axis F and in directions radially outward or tilting in respect to the optical axis F. To achieve the locking feature, the detachable lens module 630 can be designed such that the force provided by the compressible component 632 in the direction H can be equal, double, triple, or ten times greater than the force provided by the compressible component 622 in the direction G.

The detachable lens module 630 can be secured to the body structure 618 or other components (not shown) of the image capture device implementing they system 600 in order to compress the compressible component 632 and exert a force in the direction H against the split barrel mount 614. The compressible component 632 may include a gasket (shown), a foam seal, a spring, or any other compliant member that will exert a force against the split barrel mount 614 in the direction H when under compression by means of the detachable lens module 630. The compressible component 632 can be affixed to the detachable lens module 630 or affixed or held in position in respect to either of the split barrel mounts 614, 615. Under the combined forces generated in the directions G and H by the compressible components 622, 632, the split barrel mount 614 can be held in position in respect to the body structure 618 and the cam 620 in a manner similar to that described in respect to the barrel mount 614 and the body structure 518 in FIG. 5 in order for the image capture device to avoid shakiness or lack of focus in image and/or video capture.

Though not shown, the actuator locking mechanism 424 of FIG. 4B can be used with a system including split barrel mounts similar to the split barrel mounts 614, 615 of FIG. 6, such as if the compressible component 622 were to act in a direction opposite to the direction G. Other combinations of actuator locking mechanisms, actuator locking mechanisms, and detachable lens modules can be implemented so as to provide locking and locking features related to actuation. In some examples, the detachable lens module 630 and/or the system 600 may include one or both of the actuator locking mechanisms 424, 524 of FIGS. 4B-5 that are each configured to apply a force against the actuator 616 (i.e., cam 620) in a H direction.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

In a first example of an embodiment, a system includes a barrel mount disposed within a body, the barrel mount comprising a central axis; a lens barrel secured within the barrel mount and aligned with the central axis; an actuator configured to adjust a position of the lens barrel by moving the barrel mount along the central axis; and an actuator locking mechanism securable over the barrel mount and/or the lens barrel and configured to prevent movement of the actuator and/or the barrel mount by applying a force along the central axis towards the actuator.

In the first example, the barrel mount may further include a flange connected with the actuator, and wherein the actuator is configured to move the barrel mount along the central axis at the flange.

In the first example, the actuator may include a cam configured to adjust a position of the barrel mount along the central axis; and a compressible component configured to apply a force against the cam.

In the first example, the compressible component and the actuator locking mechanism may apply the respective forces along the central axis in a same direction.

In the first example, the cam may be positioned between the flange and the compressible component so that the compressible component and the actuator locking mechanism may apply the respective forces along the central axis in opposing directions.

In the first example, the actuator locking mechanism may include a compressible component configured to apply the force along the central axis towards the actuator when the actuator locking mechanism is secured over the barrel mount and/or the lens barrel; and a securing component configured to secure the actuator locking mechanism over the barrel mount and/or the lens barrel by exerting a force against the compressible component, wherein the securing component includes a cover.

In the first example, the lens barrel may include a first split lens barrel associated with the actuator locking mechanism; and a second split lens barrel associated with the barrel mount, wherein the first and second split lens barrels are separated by a compressible component of the actuator locking mechanism that is configured to apply the force along the central axis against the actuator.

In the first example, the actuator locking mechanism may be configured to apply and release the force along the central axis by rotating or snap-fitting relative to the barrel mount.

In the first example, the lens barrel may be in a fixed position relative to the barrel mount, and wherein the lens barrel comprises two or more lenses.

In the first example, when the actuator locking mechanism is secured over the lens barrel, a sensor of the system may be configured to capture light through one or more lenses of the lens barrel and the actuator locking mechanism.

In a second example of an embodiment, a method includes applying, using an actuator of an image capture device, a first force on a barrel mount of the image capture device along a central axis extending longitudinally through the barrel mount; and applying, using an actuator locking mechanism, a second force on the barrel mount along the central axis such that movement of at least one of the barrel mount and a lens barrel of the image capture device disposed within the barrel mount is prevented by the applied first and second forces, wherein the first and second forces are applied in same directions or in opposing directions.

In the second example, the actuator may include a cam configured to adjust a position of the lens barrel by moving the barrel mount along the central axis; and a compressive component configured to apply the first force along the central axis against the cam and/or a flange of the barrel mount so that movement of the barrel mount is prevented.

In the second example, the actuator locking mechanism may include a compressible component configured to apply the second force along the central axis towards the actuator when the actuator locking mechanism is secured over the barrel mount; and a securing component configured to secure the actuator locking mechanism over the barrel mount by exerting a force against the compressible component, wherein the securing component comprises a cover.

In the second example, the actuator locking mechanism may rotate relative to the lens barrel and/or the barrel mount so that the second force is applied along the central axis, or the actuator locking mechanism may be compressed against the lens barrel and/or the barrel mount so that the second force is applied along the central axis.

In the second example, the lens barrel may include a first split lens barrel associated with the actuator locking mechanism; and a second split lens barrel associated with the lens barrel, wherein the first split lens barrel and the actuator locking mechanism may be detachable from the barrel mount.

In a third example of an embodiment, an image capture device includes a housing that defines a receptacle; a lens barrel that is removably attachable with the receptacle; an actuator configured to connect with and adjust a focus of the lens barrel along a central axis; and an actuator locking mechanism comprising a cover connectable over a top of the lens barrel and configured to prevent movement of the lens barrel by applying a force along the central axis towards the actuator.

In the third example, the receptacle may include a barrel mount securable with the lens barrel and configured to move the lens barrel along the central axis as actuator adjusts the focus of the lens barrel.

In the third example, the lens barrel may be removably attachable to the receptacle by rotating the lens barrel relative to the receptacle about the central axis.

In the third example, the actuator may include a cam configured to adjust a position of the lens barrel along the central axis; and a compressible component configured to apply a force against the cam.

In the third example, the lens barrel may include a first split lens barrel connectable with the actuator locking mechanism; and a second split lens barrel connectable with the receptacle, wherein the first and second split lens barrels are separated by a compressible component of the actuator locking mechanism that is configured to apply the force along the central axis against the actuator.

What is claimed is:

1. A system, comprising:

a barrel mount disposed within a body, the barrel mount comprising a central axis;

a lens barrel secured within the barrel mount and aligned with the central axis;

an actuator configured to adjust a position of the lens barrel by moving the barrel mount along the central axis, wherein the actuator comprises a cam configured to adjust a position of the barrel mount along the central axis and a compressible component configured to apply a force against the cam; and an actuator locking mechanism securable over the barrel mount and/or the lens barrel and configured to prevent movement of the actuator and/or the barrel mount by applying a force along the central axis towards the actuator, wherein the barrel mount further comprises a flange connected with the actuator, wherein the actuator is configured to move the barrel mount along the central axis at the flange, and wherein the cam is positioned between the flange and the compressible component so that the compressible component and the actuator locking mechanism apply the respective forces along the central axis in opposing directions.

2. The system of claim 1, wherein the compressible component and the actuator locking mechanism apply the respective forces along the central axis in a same direction.

3. The system of claim 1, wherein the actuator locking mechanism comprises:

a compressible component configured to apply the force along the central axis towards the actuator when the actuator locking mechanism is secured over the barrel mount and/or the lens barrel; and a securing component configured to secure the actuator locking mechanism over the barrel mount and/or the lens barrel by exerting a force against the compressible component, wherein the securing component comprises a cover.

4. The system of claim 1, wherein the lens barrel comprises:

a first split lens barrel associated with the actuator locking mechanism; and a second split lens barrel associated with the barrel mount, wherein the first and second split lens barrels are separated by a compressible component of the actuator locking mechanism that is configured to apply the force along the central axis against the actuator.

5. The system of claim 1, wherein the actuator locking mechanism is configured to apply and release the force along the central axis by rotating or snap-fitting relative to the barrel mount.

6. The system of claim 1, wherein the lens barrel is in a fixed position relative to the barrel mount, and wherein the lens barrel comprises two or more lenses.

7. The system of claim 1, wherein when the actuator locking mechanism is secured over the lens barrel, a sensor of the system is configured to capture light through one or more lenses of the lens barrel and the actuator locking mechanism.

8. A method, comprising:

applying, using an actuator of an image capture device, a first force on a barrel mount of the image capture device along a central axis extending longitudinally through the barrel mount; and applying, using an actuator locking mechanism, a second force on the barrel mount along the central axis such that movement of at least one of the barrel mount and a lens barrel of the image capture device disposed within the barrel mount is prevented by the applied first and second forces, wherein the first and second forces are applied in same directions or in different directions, and wherein the actuator locking mechanism comprises:

a compressible component configured to apply the second force along the central axis towards the actuator when the actuator locking mechanism is secured over the barrel mount; and a securing component configured to secure the actuator locking mechanism over the barrel mount by exerting a force against the compressible component, wherein the securing component comprises a cover.

9. The method of claim 8, wherein the actuator comprises:

a cam configured to adjust a position of the lens barrel by moving the barrel mount along the central axis; and a compressive component configured to apply the first force along the central axis against the cam and/or a flange of the barrel mount so that movement of the barrel mount is prevented.

10. The method of claim 8, wherein the actuator locking mechanism rotates relative to the lens barrel and/or the barrel mount so that the second force is applied along the central axis, or wherein the actuator locking mechanism is compressed against the lens barrel and/or the barrel mount so that the second force is applied along the central axis.

11. The method of claim 8, wherein the lens barrel comprises:

a first split lens barrel associated with the actuator locking mechanism; and a second split lens barrel associated with the lens barrel, wherein the first split lens barrel and the actuator locking mechanism are detachable from the barrel mount.

12. An image capture device, comprising:

a housing that defines a receptacle;

a lens barrel that is removably attachable with the receptacle;

an actuator configured to connect with and adjust a focus of the lens barrel along a central axis; and an actuator locking mechanism comprising a cover connectable over a top of the lens barrel and configured to prevent movement of the lens barrel by applying a force along the central axis towards the actuator.

13. The image capture device of claim 12, wherein the receptacle comprises:

barrel mount securable with the lens barrel and configured to move the lens barrel along the central axis as actuator adjusts the focus of the lens barrel.

14. The image capture device of claim 13, wherein the lens barrel is removably attachable to the receptacle by rotating the lens barrel relative to the receptacle about the central axis.

15. The image capture device of claim 12, wherein the actuator comprises:

a cam configured to adjust a position of the lens barrel along the central axis; and a compressible component configured to apply a force against the cam.

16. The image capture device of claim 12, wherein the lens barrel comprises:

a first split lens barrel connectable with the actuator locking mechanism; and a second split lens barrel connectable with the receptacle, wherein the first and second split lens barrels are separated by a compressible component of the actuator locking mechanism that is configured to apply the force along the central axis against the actuator.

* * * * *